(12) United States Patent
Nakamura et al.

(10) Patent No.: US 12,365,419 B2
(45) Date of Patent: Jul. 22, 2025

(54) SADDLE-TYPE VEHICLE

(71) Applicant: KAWASAKI MOTORS, LTD., Hyogo (JP)

(72) Inventors: Kenta Nakamura, Lincoln, NE (US); Seth Lansman, Lincoln, NE (US)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 18/396,877

(22) Filed: Dec. 27, 2023

(65) Prior Publication Data

US 2025/0214673 A1 Jul. 3, 2025

(51) Int. Cl.
*B62K 21/12* (2006.01)
*B62K 5/01* (2013.01)

(52) U.S. Cl.
CPC .............. *B62K 21/125* (2013.01); *B62K 5/01* (2013.01)

(58) Field of Classification Search
None
See application file for complete search history.

(56) References Cited

U.S. PATENT DOCUMENTS

| | | | |
|---|---|---|---|
| 8,534,159 B2 * | 9/2013 | Laivins | B62J 23/00 74/551.8 |
| 9,573,647 B2 * | 2/2017 | Ross | B62K 21/12 |
| 10,773,766 B2 * | 9/2020 | Stanger | B62J 17/02 |
| 2004/0173046 A1 | 9/2004 | Hancock et al. | |

* cited by examiner

*Primary Examiner* — Vicky A Johnson
(74) *Attorney, Agent, or Firm* — XSENSUS LLP

(57) ABSTRACT

A saddle-type vehicle includes: a handlebar extending in a vehicle width direction and including a handle grip at an end part on a vehicle outside; a hand guard disposed in front of the handle grip; and a hand guard stay that supports the hand guard with respect to the handlebar. The hand guard stay is fixed to the handlebar at a position close to the vehicle width direction center relative to the handle grip, and extends toward the front of the handle grip from a fixing position.

14 Claims, 10 Drawing Sheets

SADDLE-TYPE VEHICLE

BACKGROUND

Technical Field

The present disclosure relates to a saddle-type vehicle.

Background Art

Saddle-type vehicles that travel on an irregular ground represented by all terrain vehicles (ATV) include one that includes a hand guard as disclosed in US 2004/0173046 A1. The hand guard is a cover member covering a grip portion (handle grip) of the handle from the front, and is provided for the purpose of preventing wind or avoiding a ricochet.

As disclosed in US 2004/0173046 A1, the hand guard is fixed around a grip portion (handle grip) of a handlebar. However, not only operation devices such as switches and levers are disposed around the grip portion, but also harnesses such as electric wires connected to the operation devices, hydraulic pipes, and steel wires are routed. Therefore, there is few spatial allowance, and in many cases, fixing the hand guard is difficult.

SUMMARY

The present disclosure has been made in view of the above circumstances, and an object of the present disclosure is to provide a saddle-type vehicle that can be appropriately provided with a hand guard in front of a grip portion without being affected by an operation device and harnesses provided around the grip portion.

In order to solve the above problem, a saddle-type vehicle according to one aspect of the present disclosure includes: a handlebar extending in a vehicle width direction and including a handle grip at an end part on a vehicle outside; a hand guard disposed in front of the handle grip; and a hand guard stay that supports the hand guard with respect to the handlebar, in which the hand guard stay is fixed to the handlebar at a position close to a vehicle width direction center relative to the handle grip, and extends toward the front of the handle grip from a fixing position.

DETAILED DESCRIPTION

Figure 1:
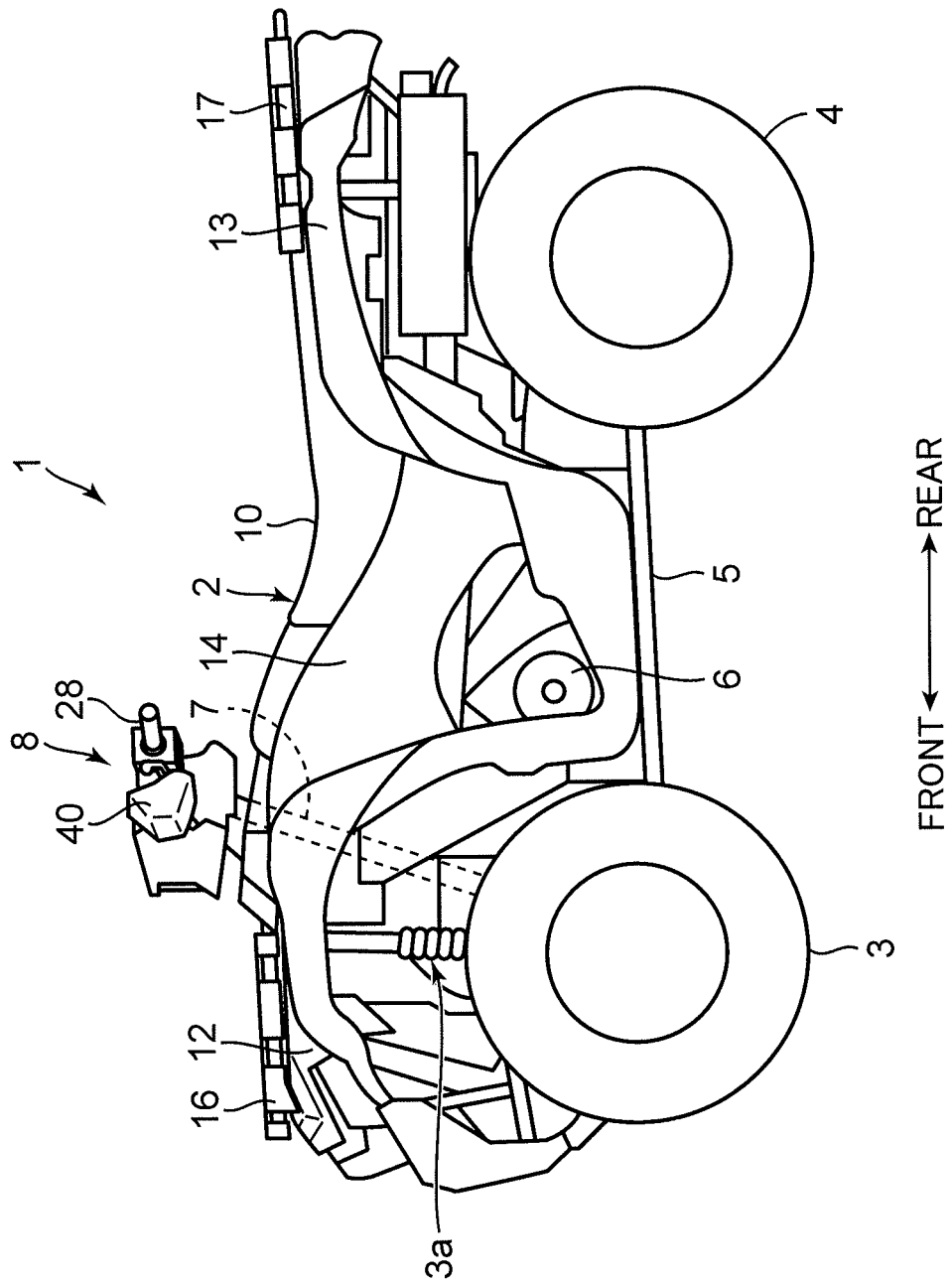
FIG. 1 is a side view of a saddle-type vehicle according to one embodiment of the present disclosure.

An embodiment of a saddle-type vehicle of the present disclosure will be described below with reference to the drawings. In the drawings, front, rear, left, and right direction indications are given, and these directions coincide with directions viewed from a driver on the saddle-type vehicle. Unless otherwise specified, when "front-rear direction" and "left-right direction" are simply mentioned, they are based on the direction indications. The vehicle width direction and the left-right direction have the same meaning.

Overall Configuration of Saddle-Type Vehicle

FIG. 1 is a side view of a saddle-type vehicle 1 according to one embodiment of the present disclosure. The saddle-type vehicle 1 is a saddle-type vehicle that is also called an ATV and is suitable for traveling on an irregular ground. The saddle-type vehicle 1 (hereinafter, called ATV 1) includes a vehicle body 2 including a vehicle body frame 5 and covers.

The vehicle body frame 5 is formed of a welding assembly with a pipe member such as a steel pipe. A front part of the vehicle body frame 5 is supported by a pair of left and right front wheels 3 via a suspension 3a, and a rear part of the vehicle body frame 5 is supported by the pair of left and right rear wheels 4 via a suspension not illustrated.

A power unit suspended from the vehicle body 2 and including an engine 6 is disposed between the front wheels 3 and the rear wheels 4 in the front-rear direction. The front wheels 3 and the rear wheels 4 are driven by the engine 6 via a transmission mechanism not illustrated such as a drive shaft. The ATV 1 is a four-wheel saddle-type vehicle that travels by drive of the front wheels 3 and the rear wheels 4.

A steering shaft 7 is supported at the front part of the vehicle body frame 5. The steering shaft 7 is inclined rearward and extends in the up-down direction. A lower end of the steering shaft 7 is coupled to the left and right front wheels 3 via a tie rod not illustrated. A handle 8 is fixed to an upper end of the steering shaft 7. A seat 10 is disposed in the rear of the handle 8 in the upper part of the vehicle body 2. The seat 10 has a saddle-type shape. By straddling this seat 10 and operating the handle 8, the occupant can steer the left and right front wheels 3.

The ATV 1 includes a front fender 12, a rear fender 13, and a vehicle body cover 14. The front fender 12, the rear fender 13, and the vehicle body cover 14 are the covers made of resin or metal constituting the vehicle body 2 together with the vehicle body frame 5, and are fixed to the vehicle body frame 5.

The front fender 12 is provided so as to cover the left and right front wheels 3 and a part between the both front wheels 3 from above. The rear fender 13 is provided so as to cover the left and right rear wheels 4 and a part between the both rear wheels 4 from above. The vehicle body cover 14 is disposed between the front fender 12 and the rear fender 13 in the front-rear direction and is provided so as to cover the power unit and the peripheral part thereof.

A front carrier 16 is disposed in front of the handle 8. A rear carrier 17 is disposed in the rear of the seat 10. The front carrier 16 and the rear carrier 17 are fixed to the vehicle body frame 5. By placing a load on the front carrier 16 and the rear carrier 17, transport of the load by the ATV 1 becomes possible.

Configuration of Handle 8

Figure 2:
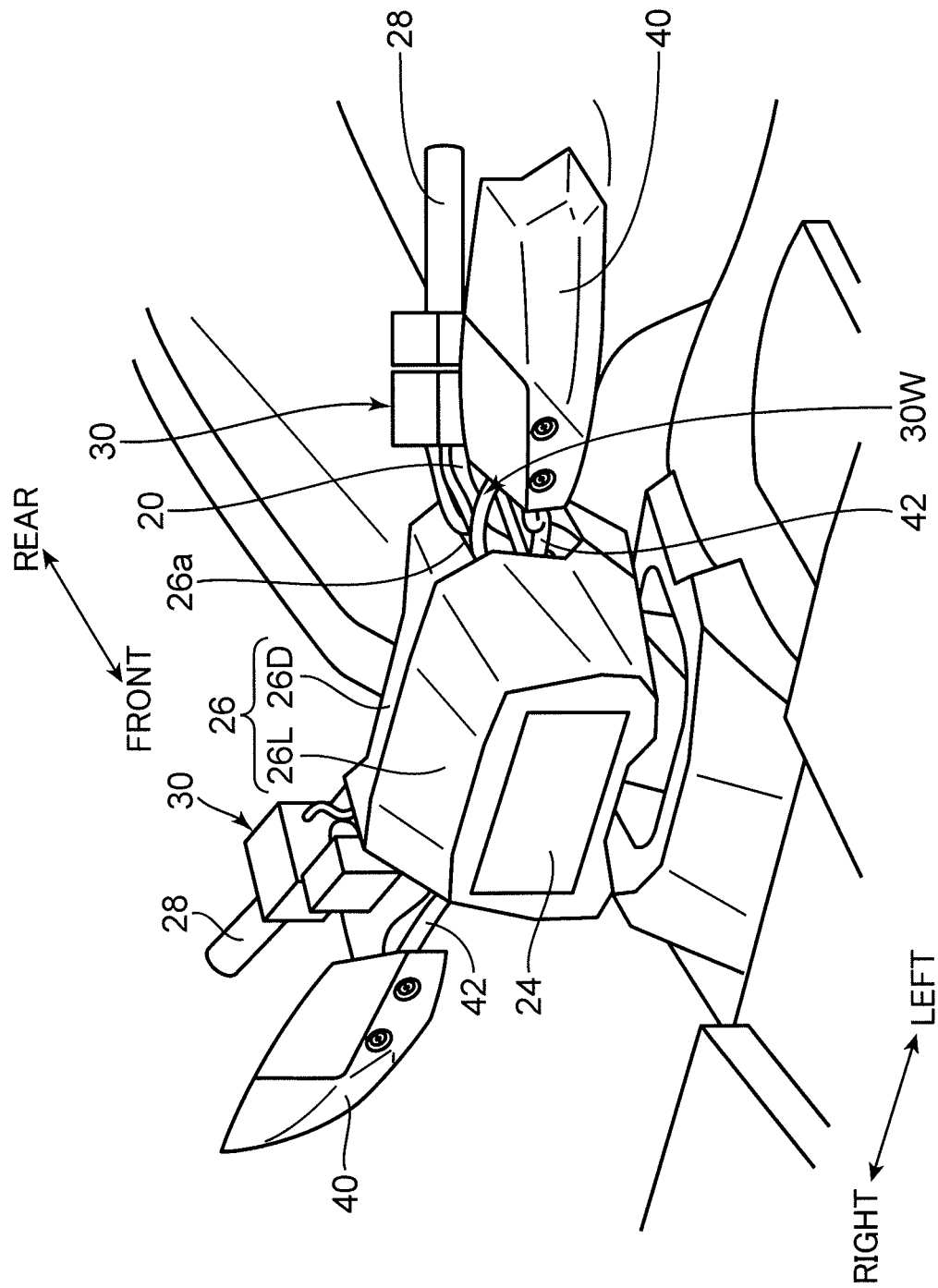
FIG. 2 is a perspective view (perspective view viewed from diagonally front) of a handle of the saddle-type vehicle.
Figure 3:
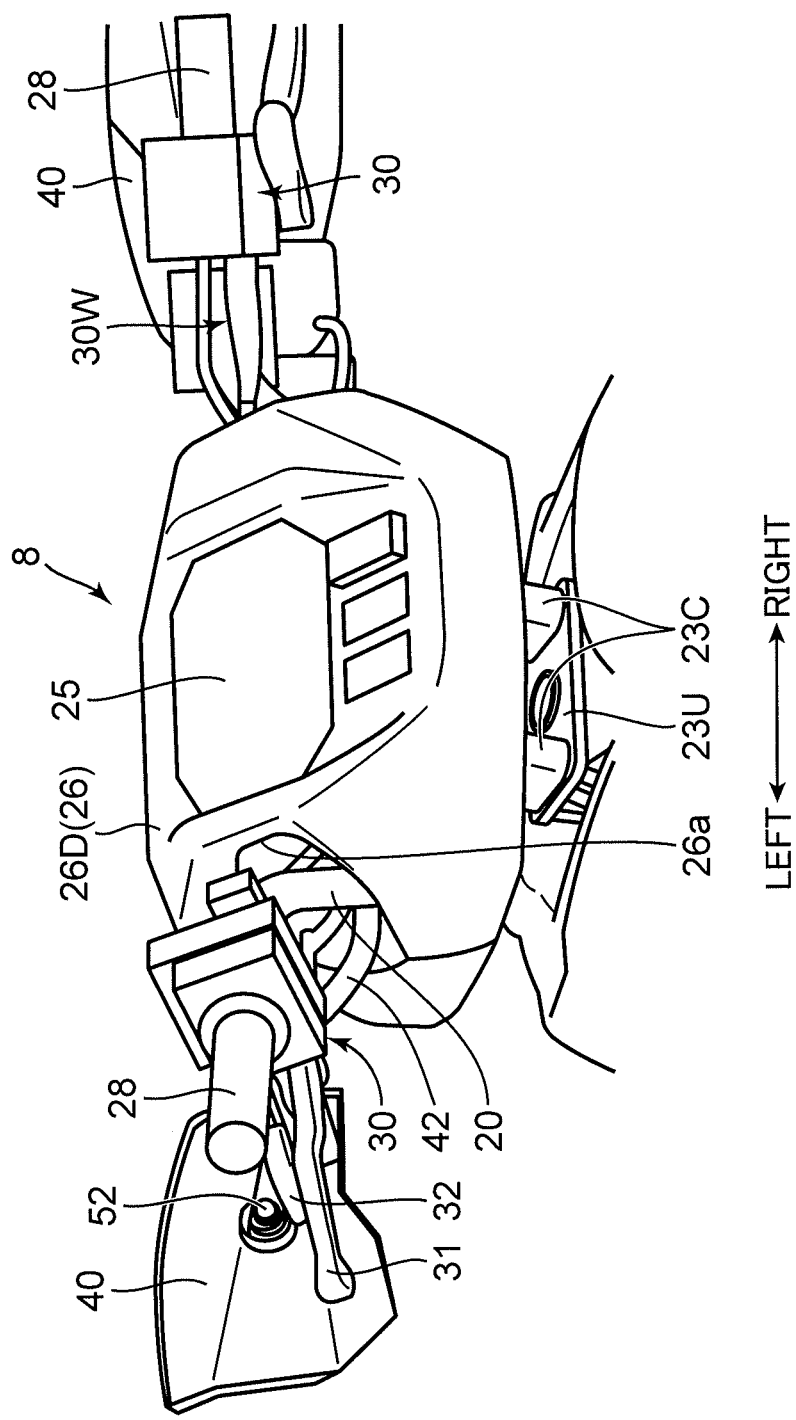
FIG. 3 is a perspective view (perspective view viewed from diagonally rear) of the handle.
Figure 4:
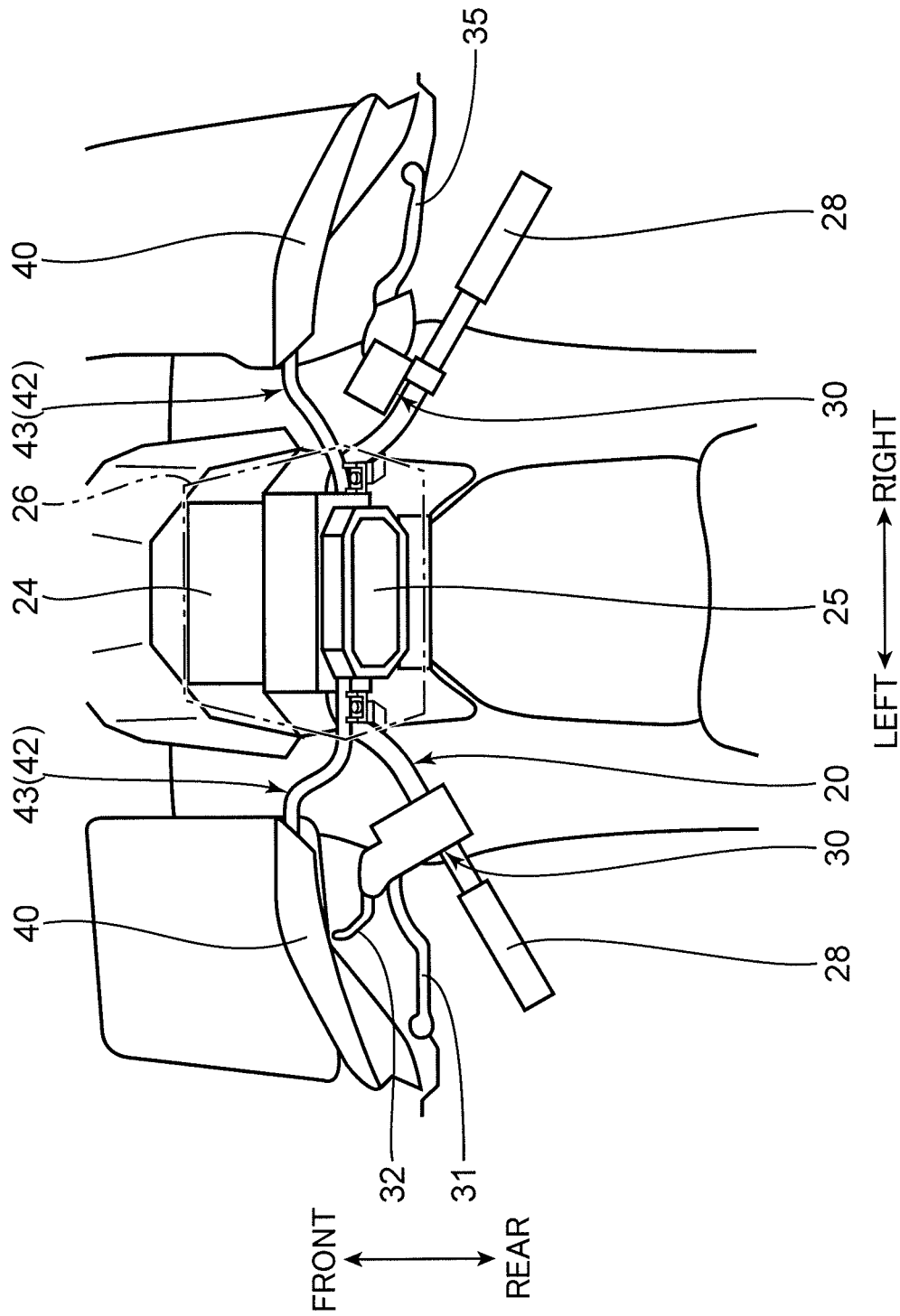
FIG. 4 is a plan view of the saddle-type vehicle including the handle.

FIGS. 2 and 3 are perspective views of the handle 8 of the ATV 1. Specifically, FIG. 2 is a perspective view of the handle 8 viewed from diagonally front left, and FIG. 3 is a perspective view of the handle 8 viewed from diagonally rear left. FIG. 4 is a plan view of the ATV 1 including the handle 8.

The handle 8 includes a handlebar 20, and a light 24, a meter device 25, a center cover 26, a handle grip 28, an operation device 30, a hand guard 40, and the like that are assembled to the handlebar 20.

The handlebar 20 is mainly made of a pipe member such as steel or aluminum, and extends in the vehicle width direction. The handlebar 20 is fixed to the steering shaft 7 at a center part thereof. Specifically, an upper end part of the steering shaft 7 is provided with an upper bracket 23U, and the handlebar 20 is fixed to this upper bracket 23U by a handle clip 23C.

The handlebar 20 includes, at its both end parts (end parts on the vehicle outside), the handle grips 28 gripped by the occupant during traveling. The meter device 25 and the light 24 are disposed at the center part of the handlebar 20. The meter device 25 is a display that displays information such as a travel speed and a fuel remaining amount, and includes, for example, a liquid crystal display device. The meter device 25 is disposed above the handlebar 20 with its display screen facing rearward and diagonally upward. The light 24 is disposed forward in front of the meter device 25. The light 24 and the meter device 25 are fixed to a center frame 27 fixed to the handlebar 20.

The center part of the handlebar 20 is provided with the center cover 26 covering the light 24 and the meter device 25. The center cover 26 includes a light cover 26L on the front side mainly covering the light 24 and a meter cover 26D on the rear side mainly covering the meter device 25, and has a box shape as a whole. An opening part 26a is formed on each of left and right side surfaces of the center cover 26. The handlebar 20 extends from the inside to the outside of the center cover 26 through the opening part 26a. The center cover 26 (26L and 26D) is fixed to the center frame 27 together with the light 24 and the meter device 25.

The operation devices 30 are disposed at positions close to the center relative to the handle grips 28 of left and right. The operation devices 30 are assembled to the handlebar 20 adjacent to the handle grip 28. The operation devices 30 include various levers and switches operated by the occupant.

The operation device 30 on the right side includes, for example, switches including a start switch not illustrated and levers including an accelerator lever not illustrated and a front wheel brake lever 35. The start switch is a switch that starts the engine 6. The accelerator lever is a lever for controlling the output of the engine 6. The front wheel brake lever 35 is a lever for controlling the brake of the front wheels 3.

The operation device 30 on the left side includes, for example, switches including a light switch not illustrated, and levers including a rear wheel brake lever 31 and a parking lever 32. The light switch is a switch for switching on/off of the light 24. The rear wheel brake lever 31 is a lever for controlling the brake of the rear wheels 4. The parking lever 32 is a lever for applying a brake during parking. Note that the switches and levers already mentioned are examples of switches and levers included in the operation devices 30. The type and arrangement of the switches and levers included in the operation devices 30 differ depending on the specific configuration of the ATV 1.

Reference numeral 30W in FIGS. 2 and 3 denotes harnesses connected to the operation devices 30. The harnesses 30W transmit operation signals of the switches included in the operation devices 30 and operation force of the levers. The harnesses 30W include electric wires, wire cables made of steel wires, and hydraulic pipes. The harnesses 30W are routed along the handlebar 20 from the operation devices 30, and extend to the inside of the center cover 26 through the opening part 26a. In FIG. 4, the harnesses 30W are not illustrated.

The hand guard 40 is disposed in front of each of the left and right handle grips 28. The hand guard 40 is a protector included in the handle 8 for the purpose of protecting the hand of the occupant gripping the handle grip 28, such as windproof or ricochet protection. The hand guard 40 is made of a hard resin and has a substantially bowl shape elongated in the vehicle width direction and protruding forward. Each of the hand guards 40 of left and right is fixed (supported) to the handlebar 20 via a hand guard stay 42. Hereinafter, the attachment structure of the hand guard 40 will be described in detail.

Attachment Structure of Hand Guard 40

Figure 5:
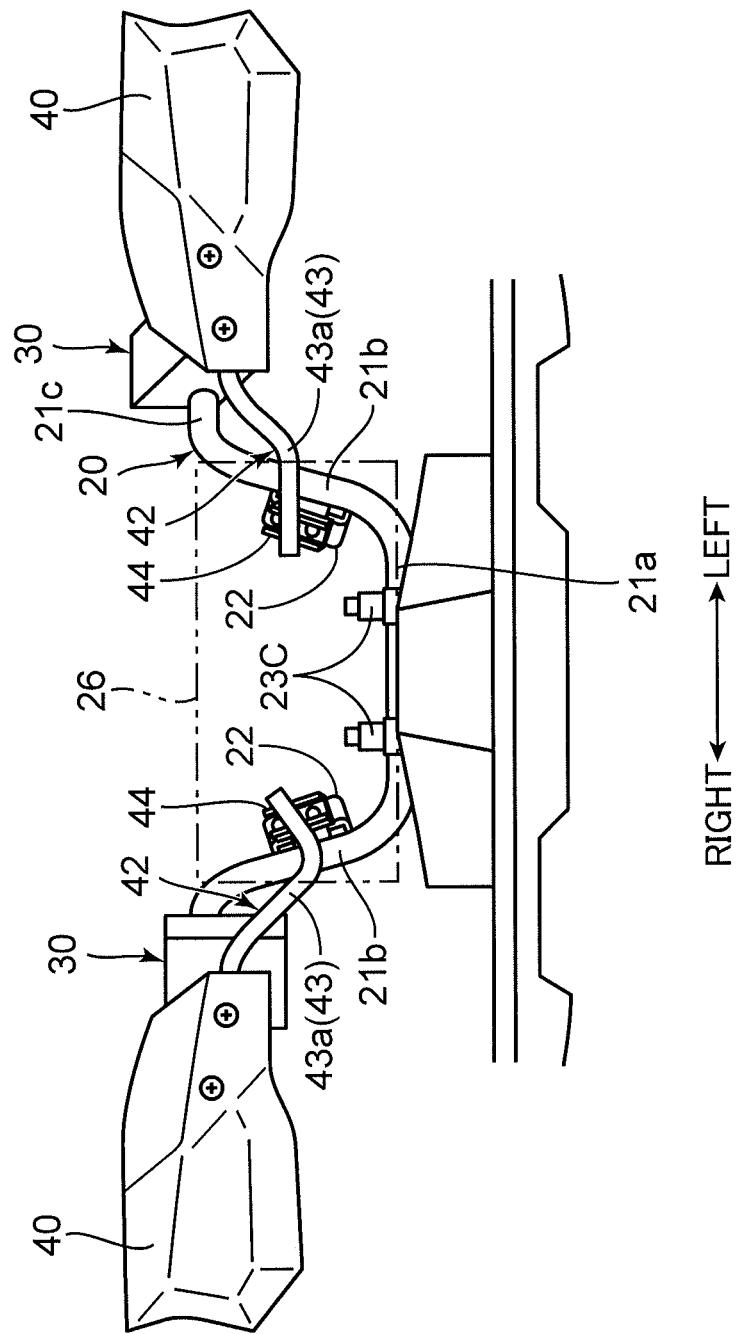
FIG. 5 is a front view of the handle.
Figure 6:
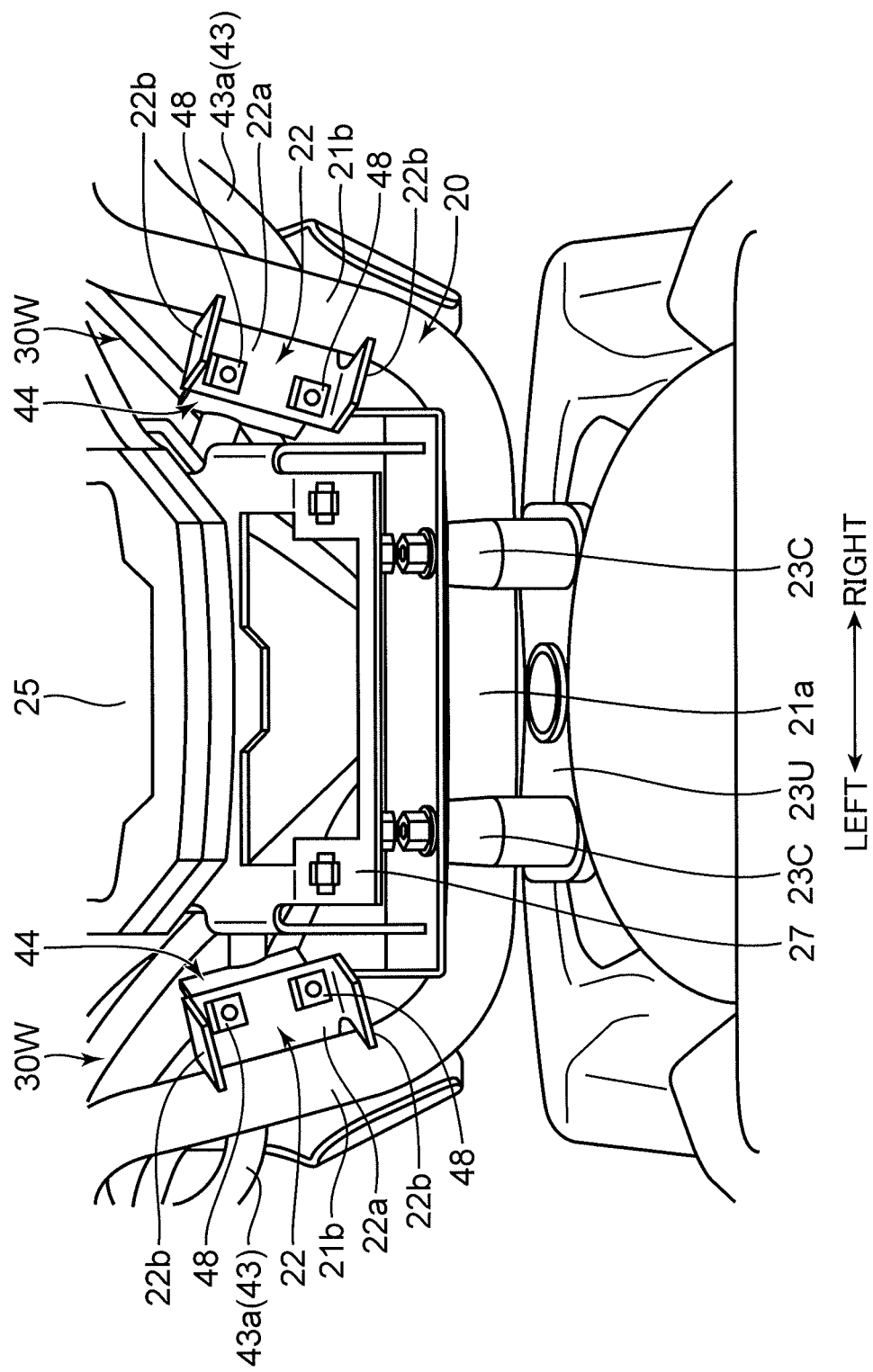
FIG. 6 is a rear view of a main part (view viewed from the rear) of the handle.
Figure 7:
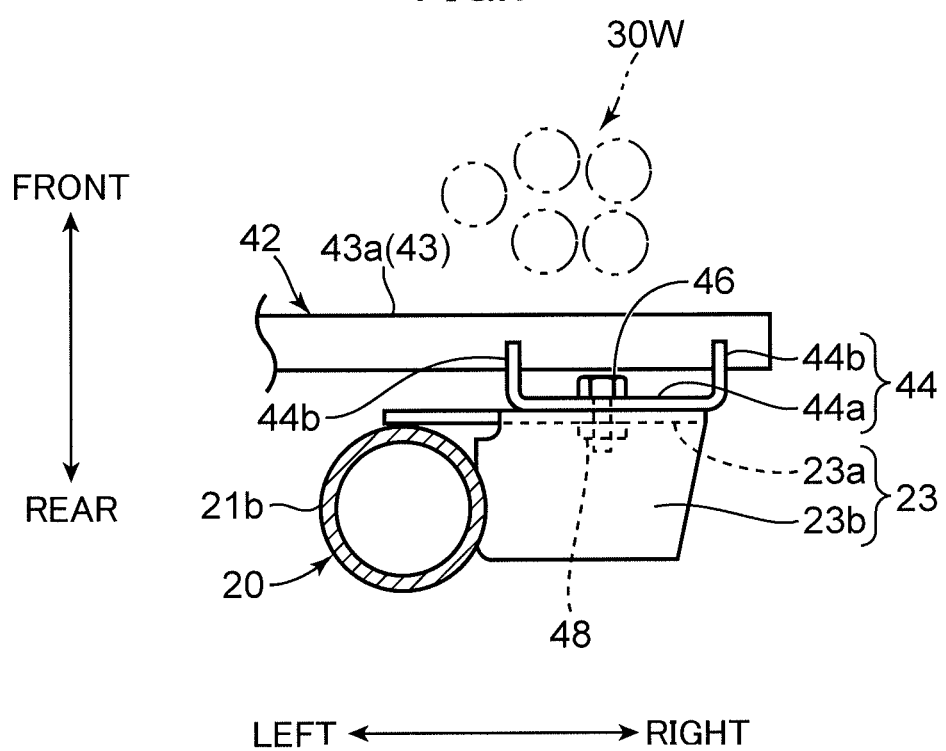
FIG. 7 is a plan view (partial cross-sectional view) illustrating a fastening structure of a hand guard stay to a handlebar.
Figure 8:
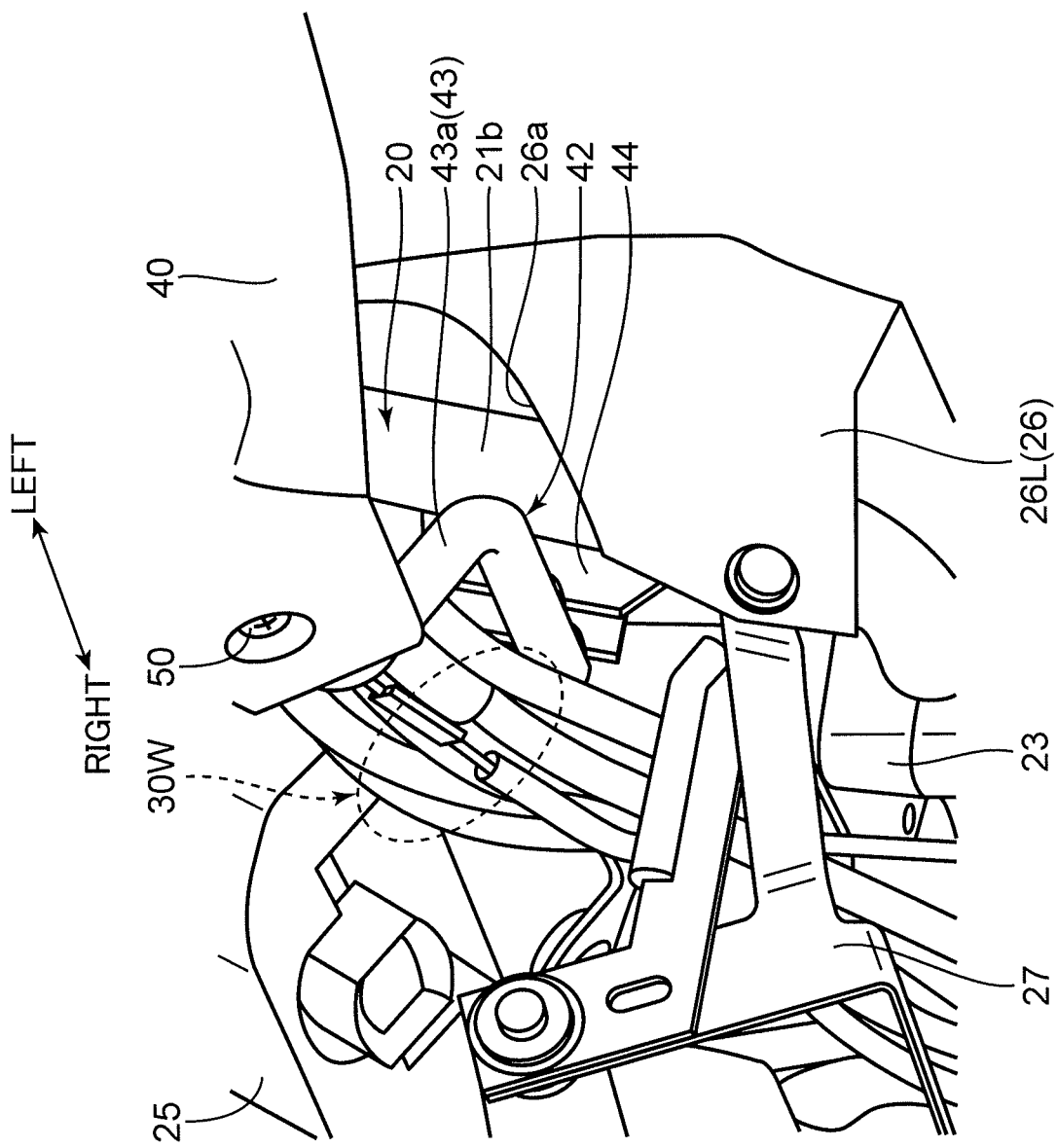
FIG. 8 is a perspective view (perspective view viewed from the front lower side) of the handle illustrating a base end part of the hand guard stay.
Figure 9:
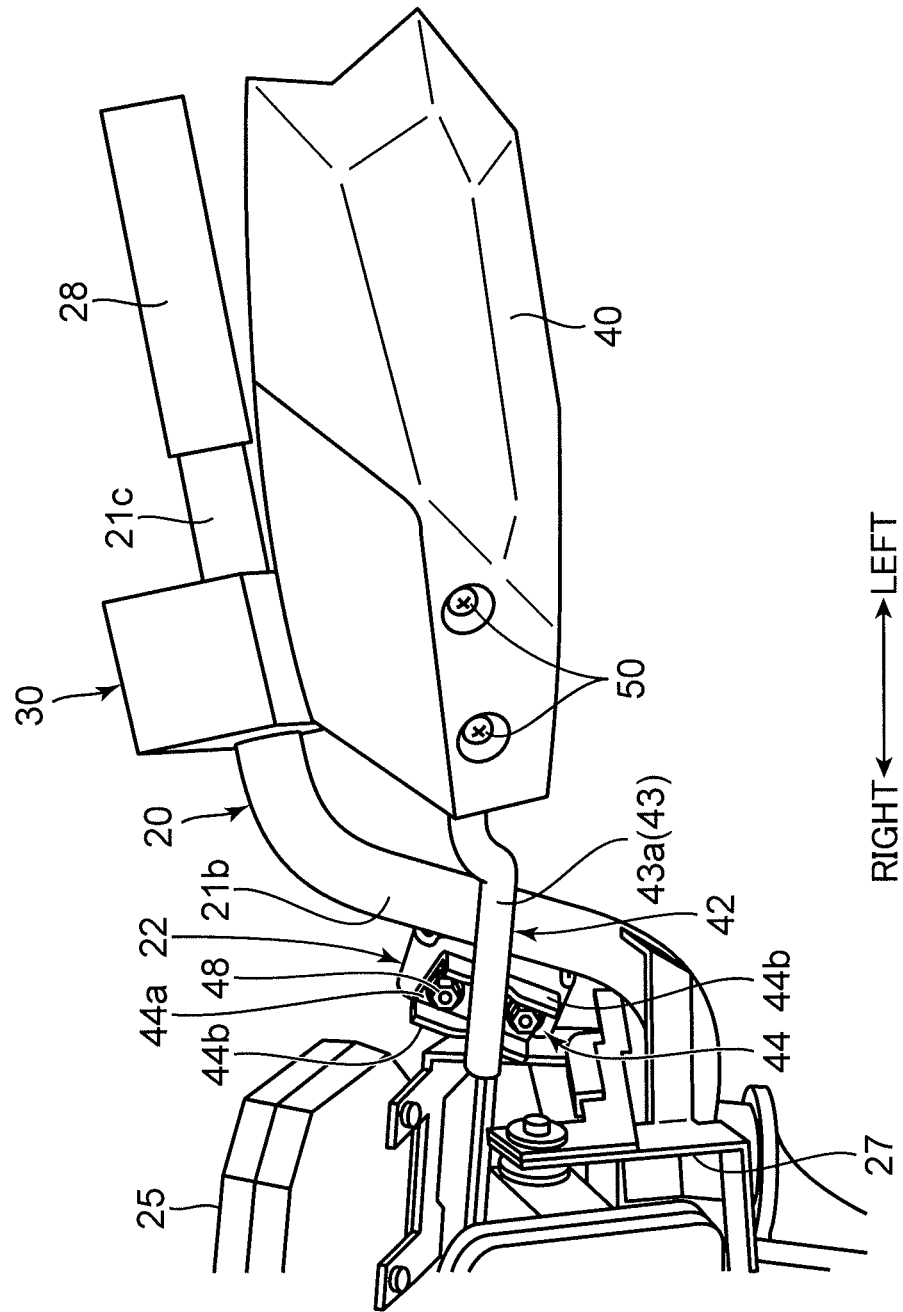
FIG. 9 is a perspective view (perspective view viewed from diagonally front) of a left end part of the handle.

FIG. 5 is a front view of the handle 8. In FIG. 5, the handle 8 is illustrated in a state where the light 24, the meter device 25, the center cover 26, and the harnesses 30W are omitted. FIG. 6 is a rear view of a main part of the handle 8 (view viewed from the rear), and FIG. 7 is a plan view (partial cross-sectional view) illustrating the fastening structure of the hand guard stay 42 with respect to the handlebar 20. FIG. 7 only illustrates the fastening structure of the hand guard stay 42 on the left side of the hand guard stays 42 of left and right. FIG. 8 is a perspective view (perspective view viewed from a lower front side) of the handle 8 illustrating a base end part of the hand guard stay 42, and FIG. 9 is a perspective view (perspective view viewed from diagonally front) of a left end part of the handle 8. In FIGS. 5 and 9, the harnesses 30W are omitted. In FIG. 8, the light cover 26L is omitted.

As illustrated in FIGS. 5, 6, and 9, the handlebar 20 includes a clamp region part 21a positioned at the vehicle width direction center, rising region parts 21b positioned outside thereof (vehicle width direction outside), and a grip region part 21c positioned outside thereof. The clamp region part 21a is a part fixed to the upper bracket 23U with the handle clip 23C, and extends horizontally and straight in the vehicle width direction. The rising region parts 21b each extend upward from the end part of the clamp region part 21a. The grip region part 21c is a part to which the handle grip 28 and the operation devices 30 are assembled, and extends outward and slightly upward from the upper end of the rising region part 21b. The handlebar 20 having such shape may be called a swan type.

A bracket 22 (may be also called a handle side bracket 22) is fixed by welding to each of the rising region parts 21b of the handlebar 20. The bracket 22 is a part to which the hand guard stay 42 is fixed. The bracket 22 is a press-molded member made of a plate material. As illustrated in FIGS. 6 and 7, the bracket 22 is formed to have a U shaped cross section including a flat attachment surface part 23a including an attachment surface facing forward and a pair of side surface parts 23b extending rearward from upper and lower ends of the attachment surface part 23a. The left and right brackets 22 are fixed to the left and right rising region parts 21b of the handlebar 20 so as to be positioned inside the rising region parts 21b.

The hand guard stay 42 is fixed to each of these left and right brackets 22, and the hand guard 40 is fixed to the tip end of the hand guard stay 42. A fixing structure of the hand guard stay 42 with respect to the handlebar 20 and a fixing structure of the hand guard 40 with respect to the hand guard stay 42 are common in left and right. Therefore, the hand guard stay 42 and the hand guard 40 on the left side will be described below.

The hand guard stay 42 includes a stay body 43 formed of a pipe member, and a bracket 44 (may be called a stay side bracket 44) fixed by welding to a base end part of the stay body 43. The hand guard stay 42 is fixed to the handlebar 20 by fixing the bracket 44 to the handle side bracket 22.

The bracket 44 is a press-molded member made of a plate material. As illustrated in FIGS. 7 and 9, the bracket 44 is formed to have a U shaped cross section including a flat fixed surface part 44a and a pair of side surface parts 44b extending forward from both left and right ends of the fixed surface part 44a. The stay body 43 is disposed with respect to the bracket 44 so as to straddle the both side surface parts 44b, and is fixed by welding to the bracket 44. As illustrated in FIG. 7, in a state where the fixed surface part 44a of the stay side bracket 44 is overlapped with the attachment surface part 22a of the handle side bracket 22 from the front, the fixed surface part 44a and the attachment surface part 22a are fastened by a bolt 46 and a nut 48. With this configuration, the hand guard stay 42 is fixed to the handlebar 20.

As illustrated in FIGS. 5, 6, and 9, the stay body 43 extends from a fixing position with the handlebar 20, that is, the position of the bracket 44 to the front position of the handle grip 28 while passing through the front of the rising region part 21b of the handlebar 20 and curving upward. A tip end part of the stay body 43 is positioned in front of the handle grip 28, and the tip end part is provided with a guard attachment part 43b. The guard attachment part 43b is a part to which the hand guard 40 is fixed, and has a flat shape in the front-rear direction.

The guard attachment part 43b is provided integrally with the stay body 43. Specifically, the stay body 43 is formed using a pipe member having a circular cross section as a material. The guard attachment part 43b is integrally formed with the stay body 43 by pressing the tip end part of the pipe member. That is, the stay body 43 includes the guard attachment part 43b that is flat and positioned at the tip end and a pipe part 43a having a circular cross section on the base end side relative to the guard attachment part 43b.

A cutout having a semicircular shape corresponding to the pipe part 43a of the stay body 43 is formed in the pair of side surface parts 44b of the stay side bracket 44. The stay body 43 is fixed by welding to each side surface part 44b in a state where the base end part of the stay body 43, that is, the pipe part 43a is fitted into the cutout. With this configuration, as illustrated in FIG. 7, the hand guard stay 42 is fixed by welding to the bracket 44 in a state where the pipe part 43a of the stay body 43 protrudes forward relative to the stay side bracket 44, more specifically, forward relative to the front end of each side surface part 44b. As a result, as illustrated in FIGS. 7 and 8, the pipe part 43a faces the harnesses 30W extending to the inside of the center cover 26 through the opening part 26a.

Figure 10:
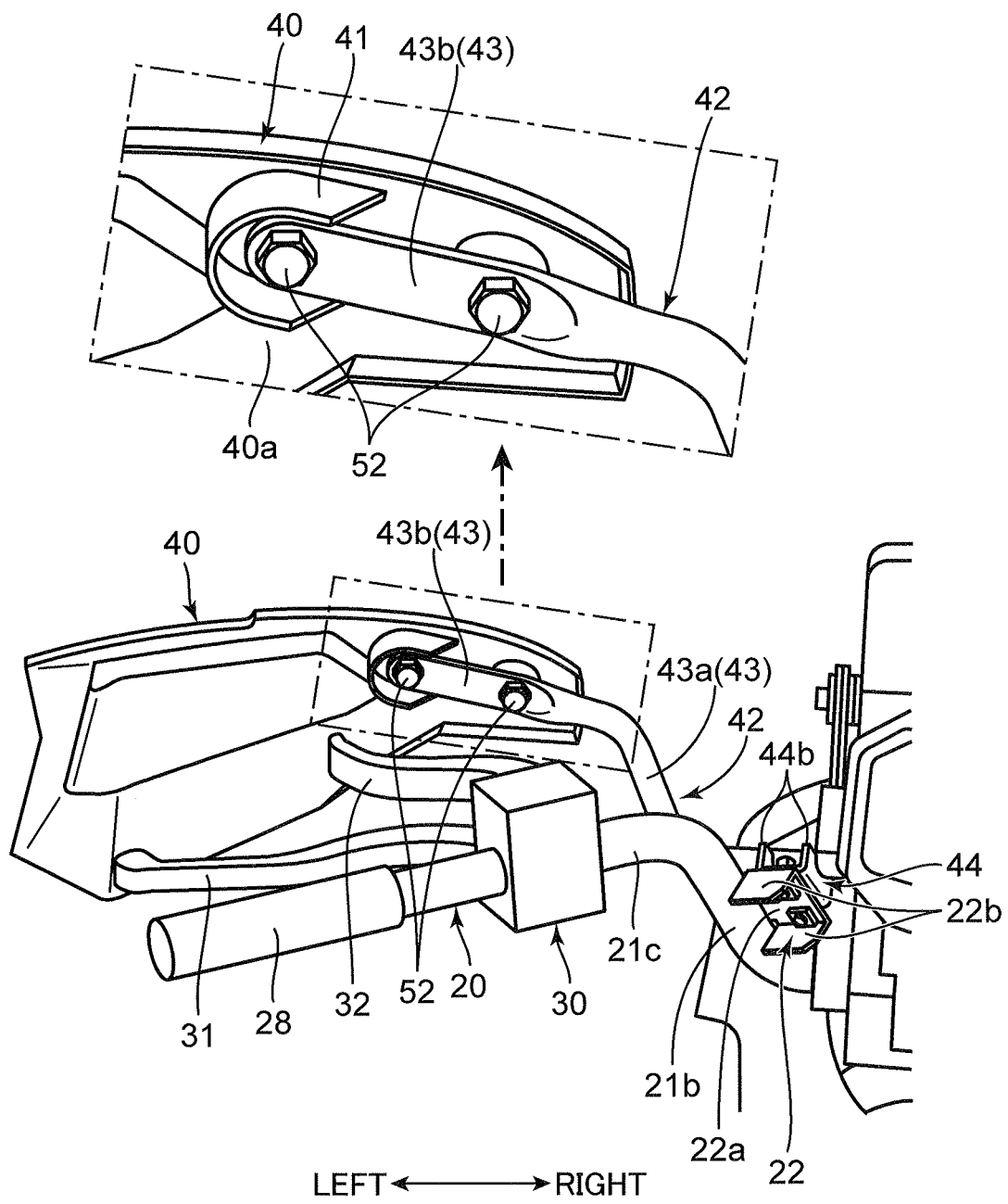
FIG. 10 is a rear view (view viewed from the rear) of the left end part of the handle.

FIG. 10 is a rear view (view viewed from the rear) of the left end part of the handle 8. As illustrated in FIG. 10, the hand guard 40 has a facing surface 40a facing the handle grip 28. The hand guard 40 has a bowl shape elongated in the vehicle width direction as already mentioned. In the hand guard 40, a part close to the right end of the facing surface 40a is overlapped with the guard attachment part 43b of the hand guard stay 42 (the stay body 43) from the front side, and is fastened to the guard attachment part 43b with a bolt 50 and a nut 52. Specifically, as illustrated in FIGS. 9 and 10, the bolt 50 is inserted from the front of the hand guard 40 into a through hole not illustrated formed in the hand guard 40 and the guard attachment part 43b, and the nut 52 is screwed to the bolt 50 from the rear side of the guard attachment part 43b. With this configuration, the hand guard 40 is fixed to the hand guard stay 42. The nut 52 is a cap nut as illustrated in FIG. 10. By using the cap nut in this manner, a screw shaft tip end of the bolt 50 is covered from the rear.

The facing surface 40a of the hand guard 40 is provided with a rib 41 (an example of the rising part) rising rearward from the facing surface 40a, that is, toward the handle grip 28 side in the vicinity of the guard attachment part 43b. The rib 41 functions as a part that prevents interference between the hand of the occupant who grips the handle grip 28 and mainly the tip end part (the left end part in FIG. 10) of the guard attachment part 43b. A rising dimension of the rib 41 from the facing surface 40a is set such that the tip end (rear end) of the rib 41 is positioned rearward relative to the nut 52 in plan view. As illustrated in FIG. 10, the rib 41 is formed in an arc shape in rear view so as to surround at least a tip end part of the guard attachment part 43b. The rib 41 may have a shape (e.g., a U shape) other than such arc shape. In place of the rib 41, a cover part (an example of the rising part) that rises from the facing surface 40a and covers the guard attachment part 43b may be provided.

Actions and Effects

As described above, in the present embodiment, the ATV 1 includes the handlebar 20 including the handle grip 28 and the hand guard 40 disposed in front of the handle grip 28, and the hand guard 40 is fixed (supported) to the handlebar 20 via the hand guard stay 42. The hand guard stay 42 is fixed to the handlebar 20 at a position close to the vehicle width direction center relative to the handle grip 28, more specifically, the rising region part 21b, and extends outward in the vehicle width direction from the fixing position. That is, it extends forward of the handle grip 28. Therefore, the hand guard 40 can be appropriately provided in front of the handle grip 28 without being affected by the operation device 30 disposed adjacent to the handle grip 28 and the harnesses 30W connected to the operation device 30.

In particular, the handlebar 20 includes the grip region part 21c (first part) to which the handle grip 28 and the operation devices 30 are assembled, and the part extending downward from the end part on the vehicle width direction center side of the grip region part 21c, that is, the rising region part 21b (second part), and as already mentioned, the hand guard stay 42 is fixed to the rising region part 21b. Therefore, the hand guard 40 can be fixed to the handlebar 20 without being affected by the operation devices 30 and the harnesses 30W disposed around the handle grip 28 at all.

Moreover, in the handlebar 20, the rising region part 21b is a part positioned between the clamp region part 21a fixed to the upper bracket 23U and the grip region part 21c, and there is almost no member to be assembled. That is, the rising region part 21b has a high degree of freedom in the position where the hand guard stay 42 is fixed. Therefore, the hand guard stay 42 can be fixed to the handlebar 20 without difficulty.

In the present embodiment, the handlebar 20 includes the handle side bracket 22, and the hand guard stay 42 includes the stay side bracket 44. The stay side bracket 44 is fastened to the handle side bracket 22 with the bolt 46 and the nut 48, whereby the hand guard stay 42 is fixed to the handlebar 20. Therefore, the hand guard stay 42 can be stably and firmly fixed to the handlebar 20 with a relatively simple structure.

In this case, in the present embodiment, the handle side bracket 22 is disposed inside the center cover 26, and the hand guard stay 42 is fixed to the handlebar 20 inside the center cover 26 and extends to the outside of the center cover 26 through the opening part 26a. That is, the brackets 22 and 44 are covered with the center cover 26. Therefore, the brackets 22 and 44 do not become an obstacle of the operation of the handle 8, and the appearance around the handle 8 is not impaired by the brackets 22 and 44.

In the present embodiment, the hand guard stay 42 (the stay body 43) extends from the fixing position to the handlebar 20, that is, the position of the bracket 44 to the front position of the handle grip 28 while passing through the front of the handlebar 20 (the rising region part 21b) and curving upward. In other words, the hand guard stay 42 is curved and extends downward from the position of the hand guard 40 toward the fixing position, through below the harnesses 30W, and extends toward the fixing position (see FIGS. 6 and 8). Therefore, the hand guard stay 42 is less likely to be an obstacle of the harnesses 30W routed along the handlebar 20 from the operation devices 30. As illustrated in FIGS. 6 to 8, since the hand guard stay 42 (the stay body 43) is provided such that the pipe part 43a thereof faces the harnesses 30W side, even if the harnesses 30W come into contact with the hand guard stay 42, the harnesses 30W are less likely to be damaged.

In particular, as illustrated in FIG. 7, in the base end part of the hand guard stay 42, the stay body 43 protrudes toward the harnesses 30W side relative to the side surface part 44b of the stay side bracket 44. As a result, the pipe part 43a of the stay body 43 faces the harnesses 30W. Therefore, it is difficult for the harnesses 30W to come into contact with the stay side bracket 44, and it is avoided that the harnesses 30W come into contact with an edge part of the side surface part 44b and are damaged.

In the present embodiment, the tip end of the hand guard stay 42 (the stay body 43) is provided with the flat guard attachment part 43b, and the hand guard 40 is fastened to this guard attachment part 43b. Therefore, the hand guard 40 can be stably attached to the hand guard stay 42. Moreover, the guard attachment part 43b is integrally provided with the stay body 43 by pressing the tip end part of the pipe member constituting the stay body 43. Therefore, the hand guard 40 can be stably attached to the hand guard stay 42 with a simple and reasonable configuration.

The hand guard 40 is fastened to the hand guard stay 42 (the guard attachment part 43b) with the bolt 50 and the nut 52, but in the present embodiment, a cap nut is used as the nut 52, and the screw shaft tip end of the bolt 50 is covered with the nut 52 from the rear. Therefore, the screw shaft art of the bolt 50 is prevented from coming into contact with the hand of the occupant.

In the embodiment, since the facing surface 40a of the hand guard 40 is provided with the rib 41 surrounding the tip end part of the guard attachment part 43b, the hand of the occupant is prevented from coming into contact with the tip end of the guard attachment part 43b, in particular, the edge part. In this case, the rib 41 is formed in an arc shape surrounding at least the tip end part of the guard attachment part 43b, and has no angulate part. Therefore, the hand of the occupant can be guarded without any trouble.

Modifications

In the above embodiment, the hand guard stay 42 is fixed to the handlebar 20 by fastening the bracket 44 of the hand guard stay 42 and the bracket 22 of the handlebar 20. However, the fixing structure of the hand guard stay 42 with respect to the handlebar 20 is not limited to the above embodiment. For example, the hand guard stay 42 may include only the stay body 43 (not including the bracket 44), and the stay body 43 may be fixed to the handle side bracket 22 by a holder member or the like. In this case, the handle side bracket 22 may be omitted, and the stay body 43 may be directly fixed to the handlebar 20 by a holder member or the like.

In the above embodiment, the handlebar 20 has a shape called a swan type including the clamp region part 21a, the rising region part 21b, and the grip region part 21c, but the shape of the handlebar 20 is not limited to the swan type. Therefore, the fixing position of the hand guard stay 42 is not limited to the rising region part 21b as in the embodiment, and an appropriate position can be selected according to the specific shape of the handlebar 20.

In the above embodiment, the four-wheel ATV 1 has been described as an example of the saddle-type vehicle. However, the attachment structure of the hand guard 40 as already mentioned can also be applied to a saddle-type vehicle other than the ATV 1, for example, a two-wheel motorcycle.

Summary

The above-described embodiment and its modifications include the following disclosure.

A saddle-type vehicle according to one aspect of the present disclosure includes: a handlebar extending in a vehicle width direction and including a handle grip at an end part on a vehicle outside; a hand guard disposed in front of the handle grip; and a hand guard stay that supports the hand guard with respect to the handlebar. The hand guard stay is fixed to the handlebar at a position close to the vehicle width direction center relative to the handle grip, and extends toward the front of the handle grip from a fixing position.

According to the present disclosure, the hand guard is fixed to the handlebar via the hand guard stay. The hand guard stay is fixed to the handlebar at a position close to the vehicle width direction center relative to the handle grip, and extends toward the front of the handle grip from the fixing position. Therefore, even when an operation device such as a switch and harnesses are included around the handle grip, the hand guard can be appropriately provided in front of the handle grip without being affected by the operation device and the harnesses.

For example, the handlebar includes a first part that is a part applied with the handle grip and extending in a vehicle width direction, and a second part extending downward from an end part on a vehicle width direction center side of the first part, and the hand guard stay is fixed to the second part.

In this aspect, the hand guard stay can be fixed to the handlebar at a position further away from the handle grip.

The handlebar may include a handle side bracket, and the hand guard stay may be fixed to the handle side bracket.

In this aspect, the hand guard stay can be more stably fixed to the handlebar. The hand guard stay can be accurately fixed to a predetermined position of the handlebar. Therefore, the hand guard can be disposed without further shifting at a predetermined position in front of the handle grip.

In this case, preferably, a center cover covering a vehicle width direction center part of the handlebar, in which the center cover includes an opening part through which the handlebar is inserted, and the hand guard stay is fixed to the handlebar inside the center cover and extends to an outside of the center cover through the opening part.

In this aspect, the handle side bracket and a fixing part of the hand guard stay with respect to the handle side bracket are covered with the center cover. Therefore, the handle side bracket and the fixing part do not become an obstacle of handle operation, and the appearance around the handle is avoided from being impaired by the handle side bracket and the fixing part.

Preferably, the hand guard stay includes a stay side bracket, and the hand guard stay is fixed to the handlebar by fastening the stay side bracket to the handle side bracket.

In this aspect, the hand guard stay can be fixed more stably and firmly to the handlebar with a simple fastening structure.

It may be configured to further include: an operation device included in the handlebar adjacent to the handle grip; and harnesses extending from the operation device toward a vehicle width direction center, in which the hand guard stay extends in a downward curved manner from a position of the hand guard toward the fixing position.

In this aspect, the harnesses are routed from the operation device along the handlebar in the hand guard stay, but in this case, the hand guard stay is less likely to become an obstacle of the harnesses. In other words, it becomes possible to appropriately route the harnesses in a path along the handlebar while fixing the hand guard to the handlebar via the hand guard stay.

In this case, the hand guard stay preferably extends toward the fixing position through below the harnesses.

In this aspect, the hand guard stay becomes less likely to be an obstacle of the harnesses routed along the handlebar.

Preferably, the hand guard stay includes a pipe part, and the pipe part is provided so as to face the harnesses.

In this aspect, even when the harnesses and the hand guard stay come into contact with each other, the harnesses come into contact with the pipe part of the hand guard stay, and therefore the harnesses are less likely to be damaged.

Preferably, the hand guard stay includes an attachment part formed to be flat, and the hand guard is fixed to the attachment part.

Thus, according to the aspect in which the hand guard is fixed to the flat attachment part provided in the hand guard stay, the hand guard can be stably fixed to the hand guard stay.

In this case, the hand guard is disposed on a front side of the attachment part and is fastened to the attachment part with a bolt and a nut, and the nut includes a cap nut, and is screwed to the bolt on a rear side of the attachment part.

In this aspect, it is possible to avoid the tip end of the bolt fixing the hand guard from being exposed on the handle grip side.

Preferably, the hand guard includes a facing surface facing the handle grip and fixed to the hand guard stay, and a rising part rising from the facing surface on a handle grip side is formed around a part to which the hand guard stay is fixed, of the facing surface.

For example, the rising part may be a rib formed on the facing surface.

In this aspect, the fixing part of the hand guard with respect to the hand guard stay is prevented from coming into contact with the hand of the occupant gripping the handle grip.

In this case, preferably, the hand guard is fixed to the hand guard stay at a terminal part on a vehicle outside of the hand guard stay, and the rib includes an arc-shaped part surrounding the terminal part of the hand guard stay.

In this aspect, the terminal part of the hand guard stay is surrounded by the arc-shaped part of the rib, and there is no angulate part. Therefore, the hand of the occupant can be guarded without any trouble.

The saddle-type vehicle is applicable to a four-wheel vehicle.

According to this aspect, in the saddle-type four-wheel vehicle traveling on an irregular ground such as an ATV, the hand guard can be appropriately provided in front of the handle grip without being affected by the operation device and harnesses disposed around the handle grip.

The invention claimed is:

1. A saddle riding vehicle comprising:
a handlebar extending in a vehicle width direction and including a handle grip at an end part on a vehicle outside;
a hand guard disposed in front of the handle grip; and
a hand guard stay that supports the hand guard with respect to the handlebar,
wherein:
the handlebar includes a handle side bracket,
the hand guard stay includes a stay side bracket,
the hand guard stay is fixed to the handlebar by fastening the stay side bracket to the handle side bracket, and
the hand guard stay is fixed to the handlebar at a position closer to a vehicle width direction center than the handle grip, and extends toward the front of the handle grip from a fixing position.

2. The saddle riding vehicle according to claim 1, wherein the handlebar includes
a first part that is a part applied with the handle grip and extending in the vehicle width direction, and
a second part extending downward from an end part on a vehicle width direction center side of the first part, and
the hand guard stay is fixed to the second part.

3. The saddle riding vehicle according to claim 1, wherein;
the hand guard stay is fixed to the handle side bracket.

4. The saddle riding vehicle according to claim 1, further comprising:
a center cover covering a vehicle width direction center part of the handlebar,
wherein:
the center cover includes an opening part through which the handlebar is inserted, and
the hand guard stay is fixed to the handlebar inside the center cover and extends to an outside of the center cover through the opening part.

5. The saddle riding vehicle according to claim 1, wherein;
the hand guard stay includes an attachment part formed to be flat, and
the hand guard is fixed to the attachment part.

6. The saddle riding vehicle according to claim 5, wherein;
the hand guard is disposed on a front side of the attachment part and is fastened to the attachment part with a bolt and a nut, and the nut includes a cap nut, and is screwed to the bolt on a rear side of the attachment part.

7. The saddle riding vehicle according to claim 1, wherein;
the hand guard includes a facing surface facing the handle grip and fixed to the hand guard stay, and
a rising part rising from the facing surface on a handle grip side is formed around a part to which the hand guard stay is fixed, of the facing surface.

8. The saddle riding vehicle according to claim 7, wherein:
the rising part is a rib formed on the facing surface.

9. The saddle riding vehicle according to claim 8, wherein:
the hand guard is fixed to the hand guard stay at a terminal part on a vehicle outside of the hand guard stay, and
the rib includes an arc-shaped part surrounding the terminal part of the hand guard stay.

10. The saddle riding vehicle according to claim 1, wherein;
the saddle riding vehicle is a four-wheel vehicle.

11. A saddle riding vehicle, comprising:
a handlebar extending in a vehicle width direction and including a handle grip at an end part on a vehicle outside;
a hand guard disposed in front of the handle grip;
a hand guard stay that supports the hand guard with respect to the handlebar;
an operation device included in the handlebar adjacent to the handle grip; and
harnesses extending from the operation device toward the vehicle width direction center,
wherein:
the hand guard stay is fixed to the handlebar at a position closer to the vehicle width direction center than the handle grip, and extends toward the front of the handle grip from a fixing position, and
the hand guard stay extends in a downward curved manner from a position of the hand guard toward the fixing position.

12. The saddle riding vehicle according to claim 11, wherein:
the hand guard stay extends toward the fixing position through below the harnesses.

13. The saddle riding vehicle according to claim 12, wherein:
the hand guard stay includes a pipe part, and the pipe part is provided so as to face the harnesses.

14. A saddle riding vehicle comprising:
a handlebar extending in a vehicle width direction and including a handle grip at an end part on a vehicle outside;
a hand guard disposed in front of the handle grip; and
a hand guard stay that supports the hand guard with respect to the handlebar, wherein
the hand guard stay is fixed to the handlebar at a position closer to a center to a vehicle width direction center than the handle grip, and extends toward the front of the handle grip from a fixing position, and
the fixing position of the hand guard stay and the handlebar is below the handle grip.

* * * * *